(12) United States Patent
Taylor et al.

(10) Patent No.: US 10,180,790 B1
(45) Date of Patent: Jan. 15, 2019

(54) EFFICIENT CLONING AND MIGRATION OF DATA OBJECTS

(71) Applicant: EMC IP Holding Company LLC, Hopkinton, MA (US)

(72) Inventors: Alan L. Taylor, Cary, NC (US); David Haase, Fuquay Varina, NC (US); Michael C. Brundage, Cary, NC (US); Somnath A. Gulve, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 15/281,963

(22) Filed: Sep. 30, 2016

(51) Int. Cl.
  *G06F 3/00* (2006.01)
  *G06F 3/06* (2006.01)
  *G06F 12/0891* (2016.01)

(52) U.S. Cl.
  CPC .......... *G06F 3/0608* (2013.01); *G06F 3/0647* (2013.01); *G06F 3/0656* (2013.01); *G06F 3/0683* (2013.01); *G06F 12/0891* (2013.01)

(58) Field of Classification Search
  CPC ...... G06F 3/065; G06F 3/0608; G06F 3/0656; G06F 3/0683; G06F 3/0647; G06F 12/0891
  See application file for complete search history.

(56) References Cited

U.S. PATENT DOCUMENTS

| | | | |
|---|---|---|---|
| 9,916,112 B1 | 3/2018 | Taylor et al. | |
| 9,933,953 B1 | 4/2018 | Taylor et al. | |
| 2003/0028737 A1* | 2/2003 | Kaiya | G06F 3/0601 |
| | | | 711/162 |
| 2013/0339645 A1* | 12/2013 | Barve | G06F 3/065 |
| | | | 711/162 |

OTHER PUBLICATIONS

Michael L. Burriss, et al.; "Services Mobility in Storage Systems," U.S. Appl. No. 14/573,320, filed Dec. 17, 2014.
Alan L. Taylor, et al.;"Managing Data Storage Migration for Virtual Machines," U.S. Appl. No. 14/754,961, filed Jun. 30, 2015.

* cited by examiner

*Primary Examiner* — Midys Rojas
(74) *Attorney, Agent, or Firm* — BainwoodHuang

(57) ABSTRACT

A technique for copying a source data object within a data storage system to a destination includes ingesting data portions of the source object into respective pages of a cache. The cache associates the pages with respective descriptors and writes into the descriptors locations of storage elements that have been provided for storing the respective data portions at the destination. When later flushing these cache pages, each page is flushed to the location at the destination that is provided in the respective descriptor.

18 Claims, 5 Drawing Sheets

EFFICIENT CLONING AND MIGRATION OF DATA OBJECTS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly provide host access to various kinds of data objects, such as LUNs (Logical UNits), file systems, and/or virtual machine disks, for example. Sometimes, administrators may wish to make copies of host-accessible data objects, e.g., to clone such objects or to migrate them. Known techniques for copying data objects proceed by loading data blocks of a source data object into memory buffers and performing buffer-to-buffer memory copies. Eventually, the data of the source data object are written to persistent storage that backs a clone or migrated version of the source data object at a destination.

SUMMARY

Unfortunately, the prior approach for copying data objects can be inefficient. For example, performing memory-to-memory copies consumes valuable resources of a data storage system, causing those resources to be less available for handling real-time storage activities, such as servicing IO (Input/Output) requests from hosts to read and/or write data objects. As a consequence of these high resource demands, the data storage system may process IO requests too slowly, reducing system throughput and potentially failing to meet service level requirements.

In contrast with the prior approach, an improved technique for copying a source data object within a data storage system to a destination includes ingesting data portions of the source object into respective pages of a cache. The cache associates the pages with respective descriptors and writes into the descriptors locations of storage elements that have been provided for storing the respective data portions at the destination. When later flushing these cache pages, each page is flushed to the location at the destination that is provided in the respective descriptor. In this manner, each data portion of the source object is copied to the destination with a single read into cache and a single flush from cache. Advantageously, the improved technique avoids costly memory-to-memory copies and conserves valuable system resources, thereby enabling those resources to be used for additional copy operations and/or for better handling real-time processing of IO requests from hosts.

Certain embodiments are directed to a method for copying data objects within a data storage system. The method includes identifying a source object in the data storage system and a destination object to be created in the data storage system as a copy of the source object, the source object being one of a LUN (Logical UNit), a file system, and a virtual machine disk. The method further includes creating an initially-empty destination object and ingesting data portions of the source object into respective pages of a cache. The method still further includes writing descriptors associated with the pages of the cache to indicate respective storage locations at which to place the data portions of the source object to establish a copy of each of the data portions in the destination object, and performing a set of flushing operations from the cache, the set of flushing operations writing the data portions from the pages of the cache to the respective storage locations indicated by the descriptors to establish the copy of the source object in the destination object.

Other embodiments are directed to a data storage system constructed and arranged to perform a method of copying data objects, such as the method described above. Still other embodiments are directed to a computer program product. The computer program product stores instructions which, when executed on control circuitry of a data storage system, cause the data storage system to perform a method of copying data objects, such as the method described above.

The foregoing summary is presented for illustrative purposes to assist the reader in readily grasping example features presented herein; however, this summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for copying a source data object within a data storage system to a destination includes ingesting data portions of the source object into respective pages of a cache. The cache associates the pages with respective descriptors and writes into the descriptors locations of storage elements that have been provided for storing the respective data portions at the destination. When later flushing these cache pages, each page is flushed to the location at the destination that is provided in the respective descriptor. In this manner, each data portion of the source object is copied to the destination with a single read into cache and a single flushing from cache.

Figure 1:
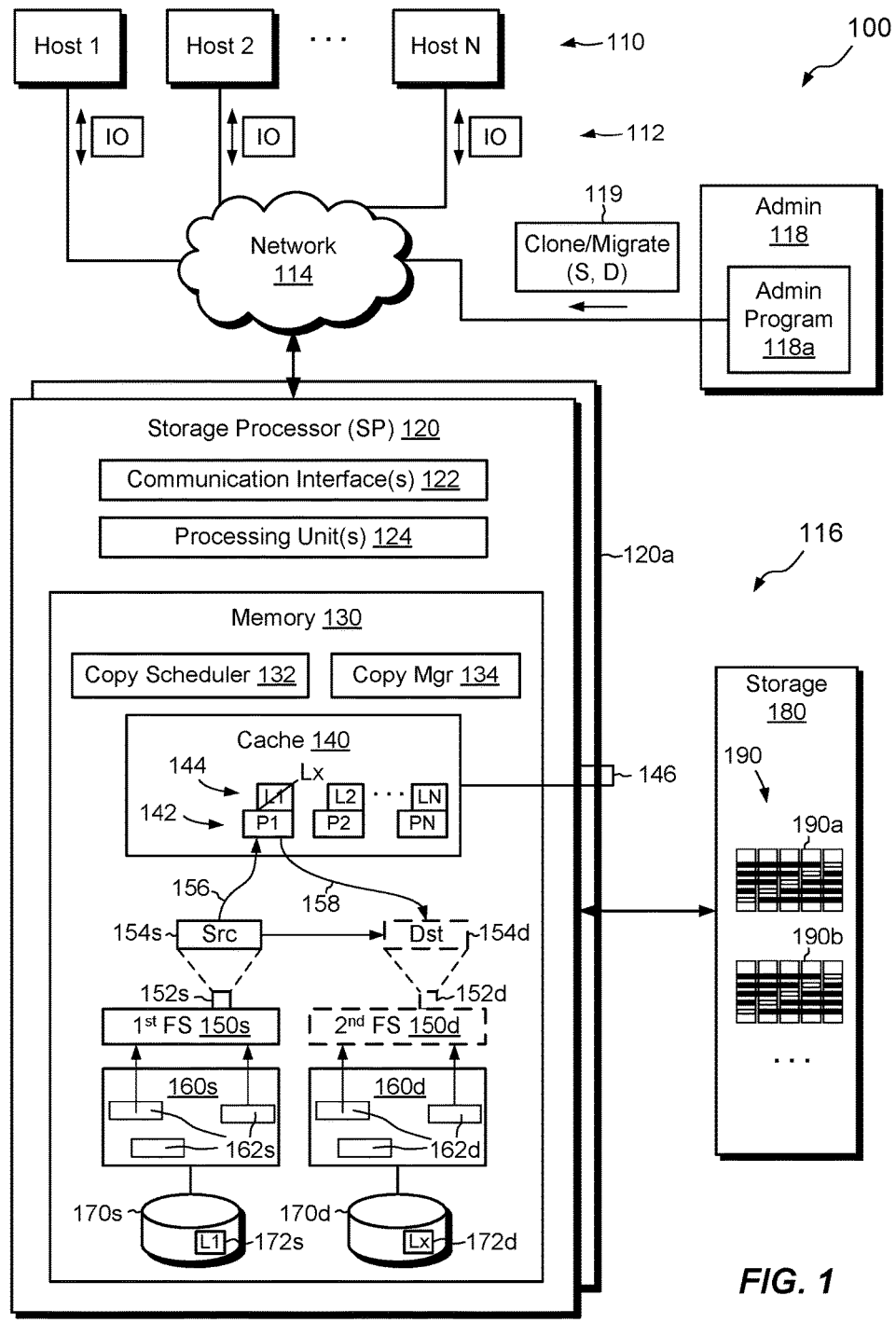
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180, such as magnetic disk drives, electronic flash drives, and the like. The storage 180, or some portion thereof, may be arranged in RAID (Redundant Array of Independent/Inexpensive Disks) groups 190, with two RAID groups 190a and 190b specifically shown.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. For example, cable 146 electronically interconnects SP 120 with SP 120a to form or extend a high-speed bus, such as PCI Express. It is understood that no particular hardware configuration is required, however, as SPs may be connected in any suitable way. Also, any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to both block-based and/or file-based protocols and to respond to such IO requests 112 by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a first file system 150s. The first file system 150s is built upon a first pool 160s of storage extents 162s, which may each be 256 MB or 1 GB, for example. The data storage system 116 may provision extents 162s from the pool 160s to the file system 150s to provide additional storage space. Likewise, the data storage system 116 may free unused extents 162s that were previously provisioned to file system 150s, sending such freed extents 162s back to the pool 160s. Although FIG. 1 shows only a single file system 150s built upon the pool 160s, one should appreciate that the pool 160s may support multiple file systems.

The extents 162s in pool 160s are themselves derived from one or more logical disks, with a single logical disk 170s being shown. In an example, each such logical disk has an address space and provides a block-based interface to a respective RAID group 190, with blocks addressed, for example, by logical disk identifier and offset. For instance, logical disk 170s provides a block-based interface into RAID group 190a. Thus, reads and writes directed to particular addresses of the logical disk 170s translate to corresponding reads and writes to particular disk drives in RAID group 190a. In an example, the data storage system 116 forms extents 162s by partitioning the logical disk 170s, e.g., with each extent 162s formed from one or more stripes of RAID group 190a.

The first file system 150s includes a file 152s. File system 150s may include any number of files, which are indexed and maintained, for example, by metadata of file system 150a. The file 152s may be referred to herein as a "container file," as it contains an entire host-accessible data object (source object 154s), such as a LUN, a file system, or a virtual machine disk. For example, all of the data and metadata needed to implement the source object 154s are contained within the file 152s. The file system 150s may likewise be referred to herein as a "container file system," as it includes one or more container files. Additional software layers (not shown) are constructed and arranged to export or otherwise express the source object 154s to hosts 110. For example, if the source object 154s is a LUN or a block-based virtual machine disk, the software layers may export the source object 154s using SCSI, iSCSI, or some other block-based protocol. Likewise, if the source object 154s is a file system or a file-based virtual machine disk, the software layers may export the source object 154s using NFS, CIFS, or some other file-based protocol.

As further shown in FIG. 1, memory 130 includes a cache 140. In an example, the data storage system implements cache 140 with dedicated memory devices, such as DRAM (Dynamic Random Access Memory). The DRAM may be battery-backed on SP 120 and mirrored to similar, battery-backed DRAM on SP 120a. To implement cache mirroring at high speed, bus 146 may convey content written to cache on one SP to cache on the other. For example, whenever cache 140 on SP 120 writes data to one of its pages 142 (P1, P2, ..., PN), cache 140 mirrors the data to a corresponding cache page on SP 120a. Only when the write is successful in cache on both SPs is it deemed complete. With this arrangement, cache 140 on SP 120 is a mirror image of cache on SP 120a, and vice-versa. Although some embodiments hereof may benefit from cache mirroring and battery-backup as described, these features are not required by other embodiments and thus should be regarded as optional.

In example operation, the hosts 110 issue IO requests 112 to the data storage system 116. The IO requests 112 specify reads and/or writes of data objects stored in the data storage system 116. The SP 120 receives the IO requests 112 at the communication interfaces 122 and initiates further processing. Such processing may include performing the requested reads and/or writes to underlying storage 180.

In the course of servicing IO requests 112 from hosts 110, an administrative program 118a running on an administrative machine 118 (or on any machine) may issue a request 119 to make an internal copy of a data object hosted by the data storage system 116. For example, request 119 may specify a particular source data object (S) to be cloned or migrated to a particular destination (D). The request 119 may identify the source object (S) by name, ID, or in any other way that the data storage system 116 recognizes. It may identify the destination (D) by proposed name, pool identifier, SP, and so forth. The request 119 may further specify whether the copy will be part of a clone operation or a migration. As is known, a "clone" is a full data copy, which produces an independent version of a source object. The clone is independent because it shares no data blocks with the object from which it is copied. In contrast, a "migration" is a movement of a data object from one pool, SP, and/or storage tier to another. Migration generally takes the source object out of service once data copying is complete, with operation proceeding using the destination version. An administrator may perform migration to place the source object on different disk drives (generally newer, faster, etc.) and/or to move the source object to an environment that supports better data services.

In response to receiving the copy request 119, a copy manager 134 running in memory 130 initiates copying activities by creating a destination object. For example, the copy manager 134 extracts the SP and pool information from the request 119 and proceeds to create an initially-empty destination object on the specified pool and SP. The destination object is initially empty because it initially contains no data from the source object.

In the example shown in FIG. 1, the copy manager 134, e.g., working in cooperation with other system components, creates a destination object 154d as a new container file 152d in a second container file system 150d. The second container file system 150d is built upon a second pool 160d, which includes storage extents 162d. In an example, the extents 162d are formed as partitions of logical disk 170d. Logical disk 170d is itself an expression of RAID group 190b. Thus, the arrangement of container file 152d, container file system 150d, pool 160d, and logical disk 170d is parallel and analogous to that of container file 152s, container file system 150s, pool 160s, and logical disk 170s. If the second container file system 150d did not exist prior to receiving the copy request 119, the copy manager 134 directs its creation on pool 160d before creating container file 152d as a new file within that container file system 150d.

In some examples, the RAID group 190b is composed of flash drives while the RAID group 190a is composed of magnetic disk drives. Thus, for example, the administrator may issue the copy request 119 in order to migrate the source object 154s to a higher storage tier, i.e., one that provides faster performance. In other examples, the RAID groups 190a and 190b may provide similar performance, but the disk drives in RAID group 190b are newer than those in RAID group 190a. In still other examples, the administrator wishes to clone, rather than migrate, the source object 154s, e.g., to replicate a "golden" version provided in the source object 154 for use by multiple parties.

Once the initially-empty destination object 154d has been created, the copy manager 134 may initiate copying of data from the source object 154s to the destination object 154d. For example, the copy manager 134 directs the cache 140 to ingest (e.g., as indicated by arrow 156) data portions of the source object 154 into respective cache pages 142 (such as page P1, but also, as needed, P2 . . . , PN).

In an example, the container file system 150s may denominate data of the source object 154 in "blocks," where each block is the smallest unit of storage that the container file system 150a can allocate. Block size is typically 4 KB or 8 KB, for example, although block sizes may vary. The sizes of cache pages 142 may also vary. In an example, however, cache pages 142 have the same size as blocks. Thus, the cache 140 may ingest data of the source object 154s into pages 152 such that each page 152 holds the data of a single respective block. This alignment of block sizes with cache pages 152 should be understood to be a convenience but not a requirement. As operation proceeds, the cache 140 may ingest many data portions of the source object 154s into respective cache pages 142, eventually ingesting all data portions of the source object 154s.

As further shown, each page 142 in cache 140 has a respective descriptor 144. In an example, the descriptor for each page 142 stores a respective location in storage (L1, L2, . . . , LN) where that page will be flushed when the time comes to flush that page. Pages may be flushed, for example, on a regular basis, in response to the cache 140 becoming full, and/or in response to other factors. Also, the cache 140 may flush pages 142 based on their age, with older pages—those holding data for the longest—flushed before younger ones.

In an example, the descriptors 144 identify flush-to locations by logical disk and offset. For example, when page P1 initially ingests a particular data portion of source object 154s from location L1 of logical disk 170s, the cache 140 writes location L1 into P1's descriptor to identify the logical disk (170s) and offset (172s) where backing storage is provided for the particular data portion. The descriptor 144 for each page 142 that receives a data portion is likewise updated to reflect the logical disk and offset backing the respective data portion. However, the locations initially written to the descriptors 144 reflect locations for the source object 154s, not for the destination object 154d. Thus, if nothing more were to happen, flushing the cache 140 would merely place the data back in the same location from which it was obtained. As described below, however, rename operations generally prevent this occurrence by redirecting pages to respective mapped storage locations backing the destination object.

Consider page P1 as an example. Sometime after page P1 has ingested the data portion backed at L1 (address 172s), the cache 140 may perform a rename operation on P1. For example, the cache 140 directs the second container file system 150d to identify a location in logical disk 170d that the second container file system 150d has provided for receiving the data portion from the source object 154s in the structure of the container file system 150d. For example, the second container file system 150d may allocate a data block to container file 152d for receiving the data portion and may map that data block to a corresponding location on logical disk 170d. In the example shown, that corresponding location is Lx at address 172d. To perform the rename, the cache 140 writes the location Lx in place of L1 in the descriptor associated with page P1. Later, when the cache 140, according to its own schedule, flushes page P1 (arrow 158), it does so to the indicated location, i.e., to location Lx at address 172d. Such rename operations may proceed in this manner for each page 142 that receives a data portion from the source object 154s. When viewed over all data portions of the source object 154s, it can be seen that data portions are loaded into cache 140 one time from their original storage locations and then flushed one time to final, mapped storage locations backing the destination object 154d. Copying the source object 154s to the destination object 154d can thus proceed with simple cache and mapping operations and without the need for expensive buffer-to-buffer copies.

One should appreciate that the cache 140 may ingest data portions from the source object 154s over time, and that complete copying of the source object 154s to the destination object 154d may involve multiple ingesting operations, as well as multiple flushing operations. Also, if the source object 154s is online, i.e., accessible to hosts 110, when the copying is being performed, the data storage system 116 may set up a mirror between the source object 154s and the destination object 154d to keep both versions synchronized until the copying is complete. Such copying can thus proceed without disruption to hosts 110.

Although the illustrated example involves a copy performed across different storage pools (160s to 160d), the same principles apply for copies performed within a single storage pool (e.g., locally within pool 160s). Further, although the illustrated example shows a copy performed within a single SP (SP 120), the same principles apply for copies between SPs (e.g., from SP 120 to SP 120a, or vice-versa). Because some embodiments involve mirroring of cache pages 142 (as well as associated descriptors 144) across SPs, the principles described above also apply to copies across SPs.

Further, although FIG. 1 shows only a single copy operation, the data storage system 116 may support multiple copy operations, e.g., with each copy operation running in a respective copy session. In such examples, a copy scheduler 132 may control activation of copy sessions over time. The data storage system 116 may run these copy sessions, or some portion of them, simultaneously. Also, the copy sessions may run while the data storage system continues to receive and process IO requests 112 from hosts 110.

Figure 2:
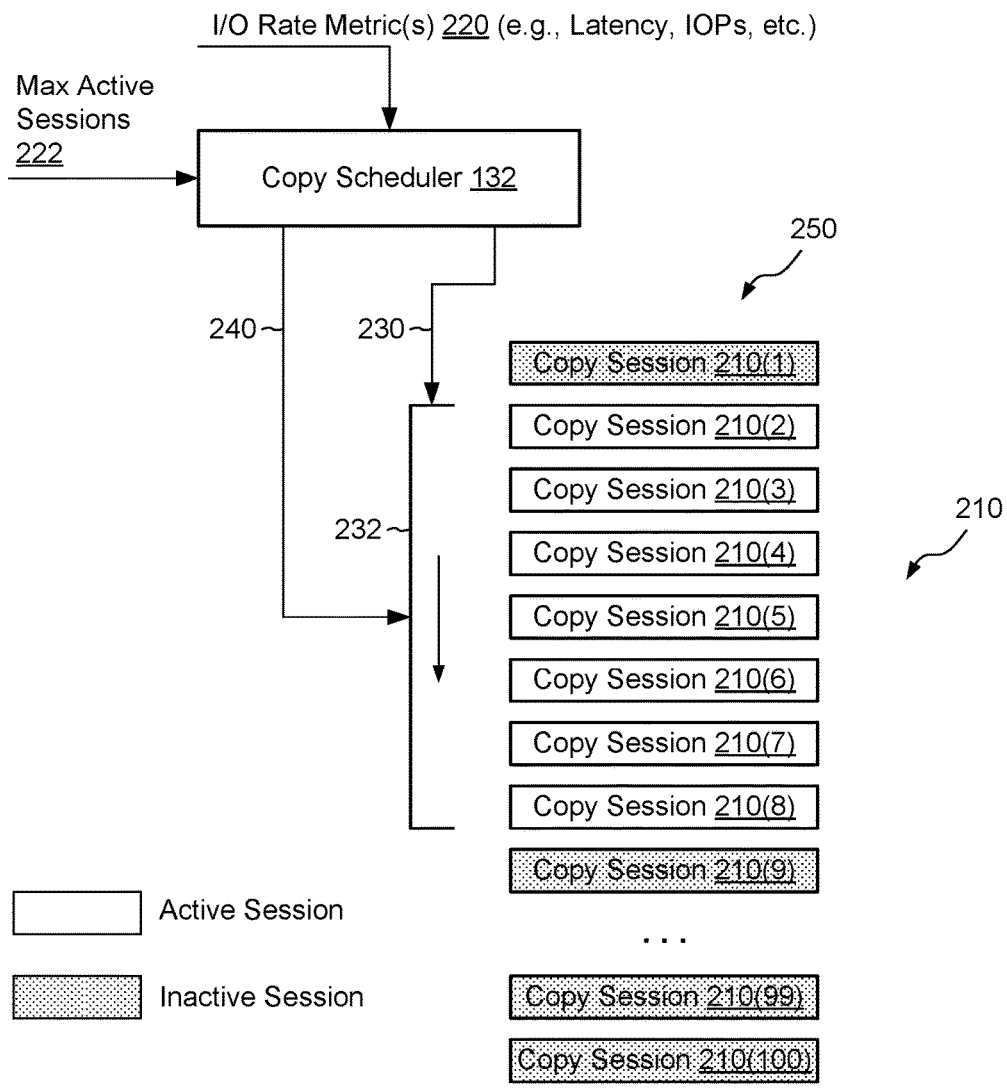
FIG. 2 is a block diagram of an example copy scheduler of FIG. 1 that selectively activates copy sessions.

FIG. 2 shows an example arrangement for controlling and activating copy sessions. Here, multiple copy sessions 210 (210(1) through 210(100)) have been started within data storage system 116 and have not yet run to completion. While all of these copy sessions 210 may be regarded as running, only a subset of them are active at any given time whereas others are inactive. For example, only sessions 210(2) through 210(8) are currently active. An "active" copy session is one that is configured to copy contents from a source data object to a destination data object. Active copy sessions generally consume a much greater share of system resources than do inactive copy sessions.

In accordance with some examples, the data storage system 116 specifies a predetermined maximum number 222 of copy sessions that may be active at any given time. In some examples, the maximum number 222 of active sessions may be set by an administrator.

In an example, the copy sessions 210(1) through 210(100) form a session list 250. Sessions drop off the session list 250 when they complete, and new sessions are added to the session list 250 when they are started.

In some examples, the copy scheduler 132 cycles through the running sessions 210, e.g., in a round-robin manner, selectively activating a group 232 of N sessions for a period of time (where N is initially the maximum number 222 and reference 240 identifies the group), before advancing to a next group of N sessions and continuing in this fashion, wrapping around to the beginning of the list 250 each time the end of the list is reached.

In some examples, the copy scheduler 132 receives IO metrics 220, which provide, for example, measures of average IO latency (average time required to process an IO request 112 to completion) and/or IOPs (number of IO requests 112 that are processed per second). These metrics, or similar ones, provided separately or together, indicate a speed of processing IO requests 112 to data objects in the data storage system 116. In an example, the copy scheduler 132 monitors this speed and throttles back a number of active copy operations 230 when it detects that the speed of processing IO requests 112 has fallen below some predetermined limit. In an example, the limit is based on a service level agreement, which requires that the data storage system 116 perform at or above a specified IOPs and/or at or below a specified IO latency. One should appreciate that the number 230 of active copy sessions may fall below the maximum number of active sessions 222. The copy scheduler 132 thus ensures that active copy sessions do not starve out IO requests 112, which generally take priority, and that the number 230 of active copy sessions will be sacrificed, if necessary, to meet the demands of service level agreements.

Figure 3:
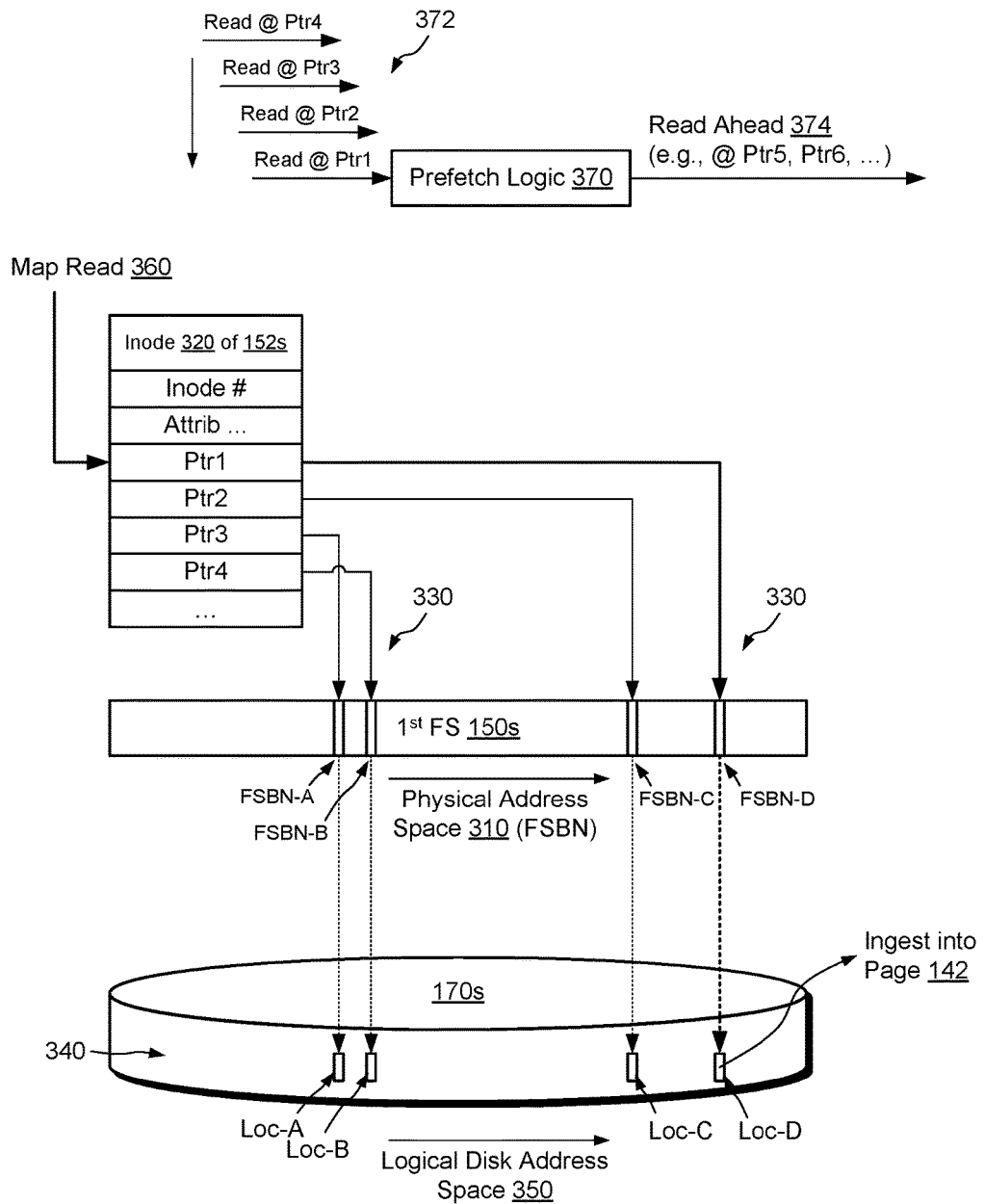
FIG. 3 is a block diagram showing example structures used to identify data portions of a source object to be read into cache.

FIG. 3 shows an example arrangement for identifying locations in storage that back data portions of the source object 154s. In an example, the copy manager 134 uses the identified locations for locating and fetching data portions into pages 142 of cache 140 (FIG. 1).

Here, the first container file system 150s is seen to have a physical address space 310, which ranges, for example, from zero to some large number. Each address in the physical address space 310 is provided in the form of a File System Block Number, or "FSBN," and may be used to address a respective block (e.g., an 8 KB allocation unit). Four blocks 330 are specifically shown.

The file system 150s may include data and metadata for supporting multiple files, including the container file 152s (FIG. 1). The container file 152s has an inode 320, which stores file-specific information, such as a unique inode number, attributes of the container file 152, and pointers, beginning with Ptr1 through Ptr4 and typically extending further. Each pointer points to a respective data block in the file system 150s that stores a data portion of the container file 152s. In the illustrated example, Ptr1 points to a block at address FSBN-D, e.g., by storing the value of FSBN-D. In a like manner, Ptr2 points to a block at FSBN-C, Ptr3 points to a block at FSBN-A, and Ptr4 points to a block at FSBN-B.

Although not shown for the sake of simplicity, inode 320 may also include indirect block pointers, which point to indirect blocks that store arrays of pointers to other indirect blocks or to data blocks. The indirect blocks may form a tree, with leaf indirect blocks including pointers that point to data blocks. Indirect blocks therefore extend the indexing scheme for the file 152s to support large file sizes.

As further shown in FIG. 3, each data block 330 of container file 152s corresponds, one-to-one, with a respective addressable storage element 340 in logical disk 170s. For example, logical disk 170s has its own address space 350. Each FSBN in the physical address space 310 maps to a corresponding address in the logical disk 170s. For example, the block 330 at FSBN-A corresponds to and is backed by a storage element at Loc-A of the logical disk 170s. In a like manner, the block at FSBN-B corresponds to and is backed by Loc-B, the block at FSBN-C corresponds to and is backed by Loc-C, and the block at FSBN-D corresponds to and is backed by Loc-D.

In example operation, the copy manager 134 directs the cache 140 (FIG. 1) to ingest a data portion of the source container file 152s into a cache page 142. For example, the copy manager 134 issues a map read request 360 to the file system 150s. Here, the request 360 is directed to the data portion of the file 152s pointed to by Ptr 1. In response to the request 360, the file system 150s identifies the physical address (FSBN) pointed to by Ptr1, i.e., FSBN-D, and identifies the location in address space 350 that corresponds to FSBN-D, which in this case is Loc-D. The file system 150s then directs the cache 140 to ingest the contents at Loc-D into a cache page 142 and to write Loc-D into the descriptor 144 associated with that cache page 142. The map read request 360 may be repeated for each data portion (e.g., each pointer to a data block) of file 152s, with each request 360 causing a cache page 142 to ingest a respective data portion of file 152s from a respective location on logical disk 170s and to write the location in an associated page descriptor 144.

In an example, the copy manager 134 may initially perform map read requests 360 one at a time to sequential locations (logical addresses) of file 152s. For example, cache manager 140 directs a first request 360 to data pointed to by Ptr1, directs a second request 360 to data pointed to by Ptr2, directs a third request 360 to data pointed to by Ptr3, and so on. When performing requests 360 sequentially in this manner, prefetch logic 370 in cache 140 detects that a sequential pattern of reads is being performed on file 152s and proceeds to perform read-ahead activities 374, e.g., by accelerating reading in order from additional consecutive locations (e.g., from locations pointed to by Ptr5, Ptr6, etc.). In this fashion, ingestion of data into the cache 140 may be accelerated.

Figure 4:
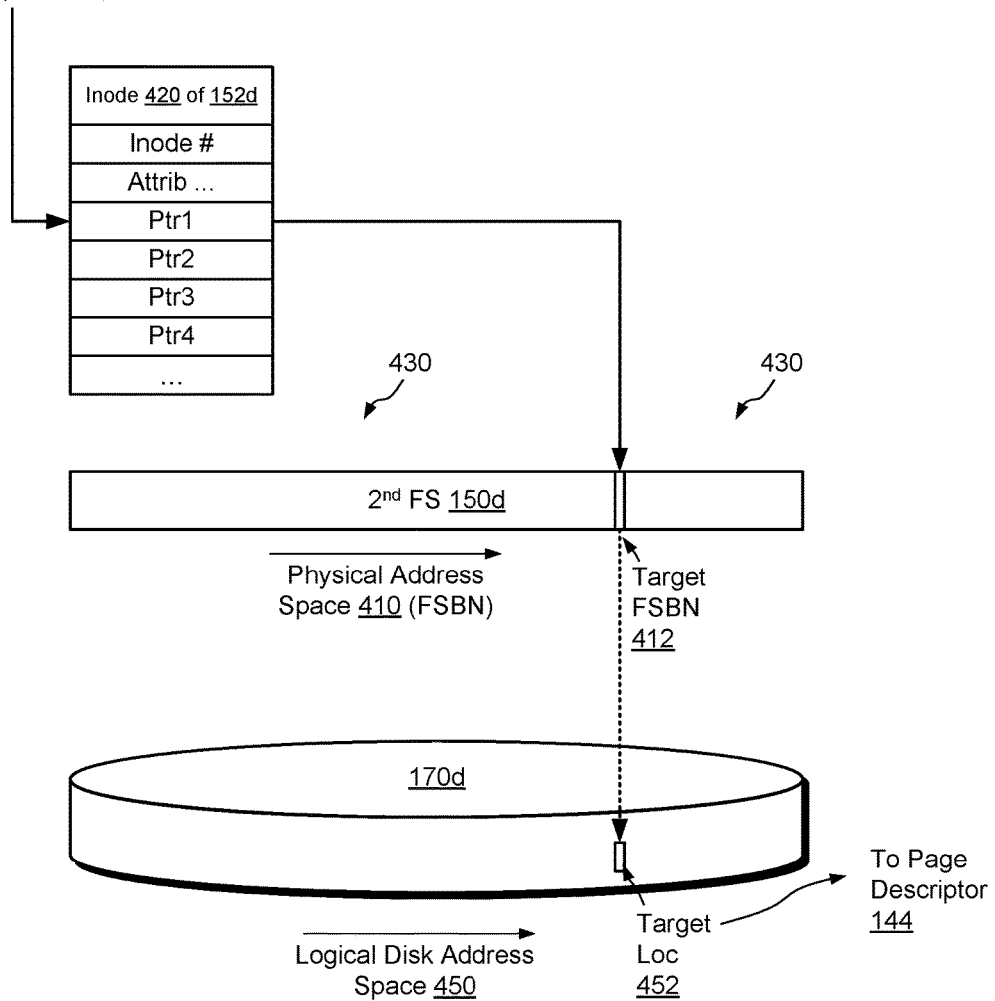
FIG. 4 is a block diagram showing example structures used to identify storage locations provided for backing copies of data portions in a destination object.

FIG. 4 shows an example arrangement for identifying target locations to which to flush cache pages 142. In an example, the activities depicted in FIG. 4 accompany the above-described rename operations performed on descriptors 144 of cache pages 142, which enable the cache 140 to flush pages 142 to mapped locations in the destination object 154d.

Here, an inode 420 for container file 152d includes pointers that point to data blocks 430 of the container file 152d. In the pictured arrangement, the destination file 152d has recently been created.

In general, data placed at logical addresses of the second container file 152d, as indexed by its block pointers, are made to match the data located at corresponding logical addresses of the first container file 152s. Thus, when placing data in file 152d, the data portion pointed to by Ptr1 in inode 420 should be the same as the data portion pointed to by Ptr1 in the inode 320, with corresponding relationships holding for other block pointers.

In example operation, the copy manager 134 issues a map write request 460 to Ptr1. The purpose of the map write request 460 is to identify a target physical address (FSBN) 412 in physical address space 410 of the second container file system 150d, at which to place a data portion from a corresponding logical address of the source. Once the file system 150d identifies the target FSBN 412, it proceeds to identify a corresponding target location 452 in logical disk 170d. For example, FSBNs of the second container file system 150d correspond one-to-one with storage addresses in address space 450 of logical disk 170d. Thus, an FSBN in address space 410 directly implies a corresponding location in address space 450. With the target location 452 identified, the file system 150d directs the cache 140 to overwrite the descriptor 144 of the cache page 142 holding this data portion. For example, the descriptor 144 associated with the page 142 that stores the data portion pointed to by Ptr1 of inode 320 is changed from Loc-D (FIG. 3) to Target Loc 452. As a result of these activities, flushing the page from cache writes the data portion to Target Loc 452, instead of back to the original location (Loc-D).

Figure 5:
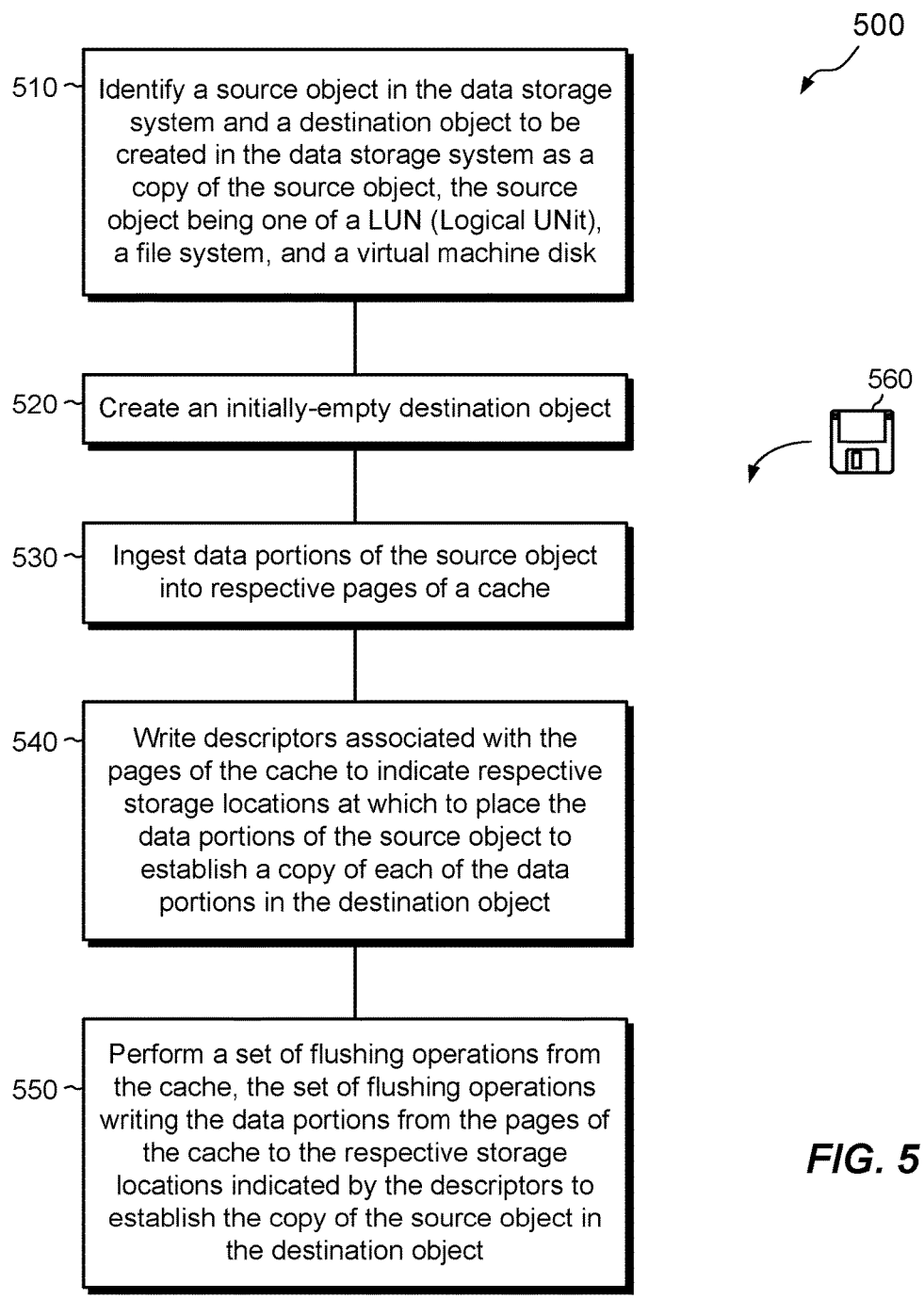
FIG. 5 is a flowchart showing an example method of copying data objects within a data storage system.

FIG. 5 shows an example method 500 that may be carried out in connection with the environment 100. The method 500 typically performed, for example, by the software constructs described in connection with FIG. 1, which reside in the memory 130 of the storage processor 120 and are run by the set of processors 124. The various acts of method 500 may be ordered in any suitable way. Accordingly, embodiments may be constructed in which acts are performed in orders different from that illustrated, which may include performing some acts simultaneously.

At 510, the method 500 identifies a source object 154s in the data storage system 116 and a destination object 154d to be created in the data storage system 116 as a copy of the source object 154s. For example, the source object 154s and the destination object 154d may be received in a request 119 from an administrative program 118a. In some examples, the source object 154s and the destination object 154d may be identified internally, e.g., in response to a cloning or migration policy in place within the data storage system 116. The source object 154s is one of a LUN (Logical UNit), a file system, and a virtual machine disk, for example.

At 520, an initially-empty destination object is created. For example, destination object 154d is created as a file 152d within a container file system 150d, which may itself be created specifically to support file 152d.

At 530, data portions of the source object 154s are ingested into respective pages 142 of a cache 140. For example, the data storage system 116 may employ activities described in connection with FIG. 3 to identify data portions of the source object 154s and to ingest them into cache.

At 540, descriptors 144 associated with the pages 142 of the cache 140 are written to indicate respective storage locations (e.g., Lx, or 452) at which to place the data portions of the source object 154s to establish a copy of each of the data portions in the destination object 154d.

At 550, a set of flushing operations 158 are performed from the cache 140. The set of flushing operations 158 write the data portions from the pages 142 of the cache 140 to the respective storage locations (e.g., Lx, or 452) indicated by the descriptors 144 to establish the copy of the source object 154s in the destination object 154d.

An improved technique has been described for copying a source data object 154s within a data storage system 116 to a destination. The technique includes ingesting data portions (e.g. blocks) of the source object 154s into respective pages 142 of a cache 140. The cache 140 associates the pages 142 with respective descriptors 144 and writes into the descriptors 144 locations of storage elements (e.g., Lx, or 452) that have been provided for storing the respective data portions at the destination. When later flushing these cache pages 142, each page is flushed to the location at the destination that is provided in the respective descriptor 144. In this manner, each data portion of the source object 154s is copied to the destination with a single read 156 into cache 140 and a single flush 158 from cache 140. Advantageously, the improved technique avoids costly memory-to-memory copies and conserves valuable system resources, thereby enabling those resources to be used for additional copy operations and/or for better handling real-time processing of IO requests from hosts.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 560 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of copying data objects within a data storage system, the method comprising:
    identifying a source object in the data storage system and a destination object to be created in the data storage system as a copy of the source object, the source object being one of a LUN (Logical UNit), a file system, and a virtual machine disk;
    creating an initially-empty destination object;
    ingesting data portions of the source object into respective pages of a cache;
    writing descriptors associated with the pages of the cache to indicate respective storage locations at which to place the data portions of the source object to establish a copy of each of the data portions in the destination object; and
    performing a set of flushing operations from the cache, the set of flushing operations writing the data portions from the pages of the cache to the respective storage locations indicated by the descriptors to establish the copy of the source object in the destination object,
    wherein establishing the copy of the source object to the destination object is performed as part of a copy session running in the data storage system,
    wherein the data storage system runs multiple copy sessions simultaneously to effect copying of respective source objects to respective destination objects, and
    wherein the method further comprises limiting a number of copy sessions actively running simultaneously in the data storage system to a predetermined number of copy sessions.

2. The method of claim 1,
    wherein an overall number of copy sessions that have been started in the data storage system and have not yet been completed exceeds the predetermined number of copy sessions, and
    wherein the data storage system selectively activates copy sessions in a round-robin manner, such that each of the overall number of copy sessions makes progress even though no more than the predetermined number of copy sessions are active at a given time.

3. The method of claim 1,
    wherein the data storage system receives and processes host IO requests directed to a set of data objects stored in the data storage system while simultaneously running a number of copy sessions, and
    wherein the method further comprises (i) detecting that a rate of processing IO requests directed to the set of data objects has fallen below a predetermined limit and (ii) in response to such detecting, reducing the number of copy sessions that are actively running in the data storage system.

4. The method of claim 1, wherein ingesting data portions of the source object into respective pages of the cache includes:
    performing multiple fetch operations of respective data portions from respective sequential addresses of the source object, the fetch operations performed sequentially in order of address;
    detecting, by prefetch logic in the cache, that data portions are being fetched in order from sequential addresses of the source object; and
    in response to such detecting, reading ahead, by the prefetch logic, data portions of the source object from additional sequential addresses of the source object, thereby accelerating ingestion of data portions of the source object into cache.

5. The method of claim 1,
    wherein the data storage system implements the source object in a container file of a container file system, the container file having metadata that maps logical ranges of the container file to respective physical addresses in the container file system, each such physical address backed by a respective addressable storage element, and
    wherein ingesting the data portions of the source object includes (i) accessing the container-file metadata to identify a physical address of a particular data portion in the container file system, (ii) identifying the addressable storage element that backs that physical address, and (iii) reading the particular data portion from that addressable storage element into a page of the cache.

6. The method of claim 5,
    wherein the data storage system implements the destination object in a second container file of a second container file system, the second container file having metadata that maps logical ranges of the second container file to respective physical addresses in the second container file system, each such physical address backed by a respective addressable storage element, wherein, prior to writing the descriptors, the method further comprises (i) accessing the metadata of the second container file to identify a target physical address in the second container file system to which the particular data portion has been mapped for inclusion in the destination object and (ii) identifying a target storage address of an addressable storage element that backs the target physical address, and wherein writing the descriptors includes writing the target storage address to a descriptor associated with the page in cache that stores the particular data portion, such that, when performing the set of flushing operations, the particular data portion is flushed to the addressable storage element at the target storage address.

7. The method of claim 1, wherein the copy of a data portion of the source object to the destination object is established with a single read into the cache and a single write from the cache without copying the data portion to any memory device that is not part of the cache.

8. The method of claim 1, wherein the source object is built upon a first pool of storage extents formed from a first set of RAID (Redundant Array of Independent/Inexpensive Disks) groups, and wherein creating the initially-empty destination object includes building the destination object on a second pool of storage extents formed from a second set of RAID groups.

9. The method of claim 8, wherein the data storage system includes a first storage processor assembly, a second storage processor assembly, and a bus interconnecting the first storage processor assembly and the second storage processor assembly, wherein the cache includes a first cache component on the first storage processor assembly and a second cache component on the second storage processor assembly, wherein the source object is accessible by the first storage processor assembly and the destination object is accessible by the second storage processor assembly, wherein ingesting the data portions of the source object into respective pages of the cache includes (i) reading, by the first storage processor assembly, a data portion from the source object into the first cache component and (ii) mirroring the data portion over the bus to the second cache component in the second storage processor assembly, and wherein performing the set of flushing operations includes flushing the mirrored data portion from the second cache component to the destination object.

10. The method of claim 1, wherein ingesting the data portions of the source object includes reading the data portions into the respective pages of the cache, and wherein the descriptors are stored in the cache, such that writing the descriptors includes writing the descriptors in the cache.

11. A data storage system, comprising control circuitry that includes a set of processing units coupled to memory, the control circuitry constructed and arranged to:

identify a source object in the data storage system and a destination object to be created in the data storage system as a copy of the source object, the source object being one of a LUN (Logical UNit), a file system, and a virtual machine disk;

create an initially-empty destination object;

ingest data portions of the source object into respective pages of a cache;

write descriptors associated with the pages of the cache to indicate respective storage locations at which to place the data portions of the source object to establish a copy of each of the data portions in the destination object; and perform a set of flushing operations from the cache, the set of flushing operations writing the data portions from the pages of the cache to the respective storage locations indicated by the descriptors to establish the copy of the source object in the destination object, wherein the source object is built upon a first pool of storage extents formed from a first set of RAID (Redundant Array of Independent/Inexpensive Disks) groups, and wherein the control circuitry constructed and arranged to create the initially-empty destination object is further constructed and arranged to build the destination object on a second pool of storage extents formed from a second set of RAID groups.

12. A computer program product including a set of non-transitory, computer-readable media having instructions which, when executed by control circuitry of a data storage system, cause the control circuitry to perform a method for copying data objects within a data storage system, the method comprising:

identifying a source object in the data storage system and a destination object to be created in the data storage system as a copy of the source object, the source object being one of a LUN (Logical UNit), a file system, and a virtual machine disk;

creating an initially-empty destination object;

ingesting data portions of the source object into respective pages of a cache;

writing descriptors associated with the pages of the cache to indicate respective storage locations at which to place the data portions of the source object to establish a copy of each of the data portions in the destination object; and performing a set of flushing operations from the cache, the set of flushing operations writing the data portions from the pages of the cache to the respective storage locations indicated by the descriptors to establish the copy of the source object in the destination object, wherein the copy of a data portion of the source object to the destination object is established with a single read into the cache and a single write from the cache without copying the data portion to any memory device that is not part of the cache.

13. The computer program product of claim 12, wherein ingesting data portions of the source object into respective pages of the cache includes:

performing multiple fetch operations of respective data portions from respective sequential addresses of the source object, the fetch operations performed sequentially in order of address;

detecting, by prefetch logic in the cache, that data portions are being fetched in order from sequential addresses of the source object; and in response to such detecting, reading ahead, by the prefetch logic, data portions of the source object from additional sequential addresses of the source object, thereby accelerating ingestion of data portions of the source object into cache.

14. The computer program product of claim 12, wherein the data storage system implements the source object in a container file of a container file system, the container file having metadata that maps logical ranges of the container file to respective physical addresses in the container file system, each such physical address backed by a respective addressable storage element, and wherein ingesting the data portions of the source object includes (i) accessing the container-file metadata to identify a physical address of a particular data portion in the container file system, (ii) identifying the addressable storage element that backs that physical address, and (iii) reading the particular data portion from that addressable storage element into a page of the cache.

15. The computer program product of claim 14, wherein the data storage system implements the destination object in a second container file of a second container file system, the second container file having metadata that maps logical ranges of the second container file to respective physical addresses in the second container file system, each such physical address backed by a respective addressable storage element, wherein, prior to writing the descriptors, the method further comprises (i) accessing the metadata of the second container file to identify a target physical address in the second container file system to which the particular data portion has been mapped for inclusion in the destination object and (ii) identifying a target storage address of an addressable storage element that backs the target physical address, and wherein writing the descriptors includes writing the target storage address to a descriptor associated with the page in cache that stores the particular data portion, such that, when performing the set of flushing operations, the particular data portion is flushed to the addressable storage element at the target storage address.

16. The computer program product of claim 12, wherein the source object is built upon a first pool of storage extents formed from a first set of RAID (Redundant Array of Independent/Inexpensive Disks) groups, and wherein creating the initially-empty destination object includes building the destination object on a second pool of storage extents formed from a second set of RAID groups.

17. The computer program product of claim 16, wherein the data storage system includes a first storage processor assembly, a second storage processor assembly, and a bus interconnecting the first storage processor assembly and the second storage processor assembly, wherein the cache includes a first cache component on the first storage processor assembly and a second cache component on the second storage processor assembly, wherein the source object is accessible by the first storage processor assembly and the destination object is accessible by the second storage processor assembly, wherein ingesting the data portions of the source object into respective pages of the cache includes (i) reading, by the first storage processor assembly, a data portion from the source object into the first cache component and (ii) mirroring the data portion over the bus to the second cache component in the second storage processor assembly, and wherein performing the set of flushing operations includes flushing the mirrored data portion from the second cache component to the destination object.

18. The computer program product of claim 12, wherein establishing the copy of the source object to the destination object is performed as part of a copy session running in the data storage system, and wherein the data storage system runs multiple copy sessions simultaneously to effect copying of respective source objects to respective destination objects.

* * * * *